(12) United States Patent
Halbur et al.

(10) Patent No.: US 8,061,619 B2
(45) Date of Patent: Nov. 22, 2011

(54) TRANSACTION CARD WITH EDGE-GLOW CHARACTERISTIC

(75) Inventors: Ted C. Halbur, Lino Lakes, MN (US); Erin M. Borkowski, Andover, MN (US)

(73) Assignee: Target Brands, Inc., Minneapolis, MN (US)

( * ) Notice: Subject to any disclaimer, the term of this patent is extended or adjusted under 35 U.S.C. 154(b) by 956 days.

(21) Appl. No.: 11/959,785

(22) Filed: Dec. 19, 2007

(65) Prior Publication Data

US 2009/0159691 A1 Jun. 25, 2009

(51) Int. Cl.
*G06K 19/00* (2006.01)
*G06K 19/06* (2006.01)
*G06Q 40/00* (2006.01)

(52) U.S. Cl. ........ 235/491; 235/487; 235/379; 235/492; 235/493

(58) Field of Classification Search .......... 235/379, 235/487, 492, 493, 375, 380; 705/35, 40, 705/64, 65, 66
See application file for complete search history.

(56) References Cited

U.S. PATENT DOCUMENTS

| | | | |
|---|---|---|---|
| 4,297,187 A | | 10/1981 | Deguchi et al. |
| 4,467,200 A | | 8/1984 | Kalwar et al. |
| 4,597,592 A | * | 7/1986 | Maurer et al. ............... 283/75 |
| 4,597,593 A | * | 7/1986 | Maurer ........................ 283/94 |
| 4,672,891 A | * | 6/1987 | Maurer et al. ............... 101/32 |
| 4,707,594 A | * | 11/1987 | Roth ............................ 235/488 |
| 4,882,477 A | * | 11/1989 | Oogita et al. ............... 235/488 |
| 5,005,873 A | * | 4/1991 | West ............................ 283/92 |
| 5,092,809 A | | 3/1992 | Kessler |
| 5,134,773 A | * | 8/1992 | LeMaire et al. ............. 29/827 |
| 5,380,044 A | * | 1/1995 | Aitkens et al. .............. 156/277 |
| 5,407,711 A | | 4/1995 | Lovison et al. |
| 5,478,629 A | * | 12/1995 | Norman ...................... 428/200 |
| 5,776,287 A | * | 7/1998 | Best et al. ................... 156/260 |
| 5,844,230 A | * | 12/1998 | Lalonde ...................... 235/487 |
| 5,856,661 A | * | 1/1999 | Finkelstein et al. ......... 235/487 |
| 5,928,989 A | * | 7/1999 | Ohnishi et al. .............. 503/227 |
| 5,958,524 A | | 9/1999 | Dehennau et al. |

(Continued)

FOREIGN PATENT DOCUMENTS

JP 02281999 A * 11/1990

(Continued)

OTHER PUBLICATIONS

Banig, David, "Corona Surface Treatment Allows for Effective Printing on Plastic Film and Substrates," available at www.ezinarticles.com/?Corona-Surface-Treatment-Allows-For-Effective-Printing-On-Plastic-Film-And-Substrates&id=450025, Feb. 10, 2007, 2 pages.

(Continued)

*Primary Examiner* — Daniel Walsh
(74) *Attorney, Agent, or Firm* — Griffiths & Seaton PLLC

(57) ABSTRACT

A transaction card includes a single layer substrate and an account identifier. The single layer substrate is formed of a transparent polymer resin mixed with a fluorescent dye such that the single layer substrate exhibits an edge-glow characteristic. The single layer substrate is one of transparent and translucent. The account identifier is connected to the single layer substrate and links the transaction card to at least one of an account and a record. The account identifier is machine readable by a point-of-sale terminal. Stored-value card assemblies, methods of encouraging purchase and facilitating use of a stored-value card and other embodiments are also disclosed.

15 Claims, 9 Drawing Sheets

U.S. PATENT DOCUMENTS

| | | | | |
|---|---|---|---|---|
| 5,959,289 | A * | 9/1999 | Okada et al. | 235/487 |
| 6,019,284 | A * | 2/2000 | Freeman et al. | 235/380 |
| D436,620 | S | 1/2001 | Webb et al. | |
| 6,193,156 | B1 * | 2/2001 | Han et al. | 235/454 |
| D442,627 | S | 5/2001 | Webb et al. | |
| 6,290,137 | B1 | 9/2001 | Kiekhaefer | |
| 6,296,188 | B1 | 10/2001 | Kiekhaefer | |
| 6,375,864 | B1 | 4/2002 | Phillips et al. | |
| 6,402,039 | B1 * | 6/2002 | Freeman et al. | 235/492 |
| 6,688,467 | B2 * | 2/2004 | Krupka et al. | 206/469 |
| 6,698,116 | B2 * | 3/2004 | Waldron | 40/124.11 |
| 6,705,530 | B2 | 3/2004 | Kiekhaefer | |
| 6,732,936 | B1 | 5/2004 | Kiekhaefer | |
| 6,843,422 | B2 * | 1/2005 | Jones et al. | 235/492 |
| D507,598 | S | 7/2005 | Allard et al. | |
| D508,261 | S | 8/2005 | Allard et al. | |
| D510,103 | S | 9/2005 | Allard et al. | |
| 6,986,465 | B2 | 1/2006 | Kiekhaefer | |
| 7,024,807 | B2 * | 4/2006 | Street | 40/124.06 |
| D523,471 | S | 6/2006 | Allard et al. | |
| D525,298 | S | 7/2006 | Allard et al. | |
| D525,653 | S | 7/2006 | Allard et al. | |
| D526,013 | S | 8/2006 | Allard et al. | |
| D526,014 | S | 8/2006 | Allard et al. | |
| D526,015 | S | 8/2006 | Allard et al. | |
| 7,254,557 | B1 * | 8/2007 | Gillin et al. | 705/40 |
| D554,643 | S | 11/2007 | McCarty et al. | |
| 2001/0010333 | A1 * | 8/2001 | Han et al. | 235/454 |
| 2001/0054647 | A1 * | 12/2001 | Keronen et al. | 235/492 |
| 2002/0000718 | A1 * | 1/2002 | Schwarzbauer et al. | 283/62 |
| 2002/0092914 | A1 * | 7/2002 | Pentz et al. | 235/487 |
| 2002/0130186 | A1 * | 9/2002 | Lasch et al. | 235/488 |
| 2002/0143697 | A1 | 10/2002 | Gotfried | |
| 2002/0145049 | A1 * | 10/2002 | Lasch et al. | 235/488 |
| 2003/0160912 | A1 * | 8/2003 | Stephenson | 349/86 |
| 2004/0076803 | A1 * | 4/2004 | Jaynes | 428/195.1 |
| 2004/0118930 | A1 | 6/2004 | Berardi et al. | |
| 2004/0124245 | A1 * | 7/2004 | Kiekhaefer | 235/487 |
| 2004/0217178 | A1 * | 11/2004 | Lasch et al. | 235/488 |
| 2005/0040242 | A1 | 2/2005 | Beenau et al. | |
| 2005/0040243 | A1 * | 2/2005 | Bi et al. | 235/492 |
| 2005/0064127 | A1 * | 3/2005 | Turner et al. | 428/40.1 |
| 2005/0181188 | A1 * | 8/2005 | Jaynes | 428/195.1 |
| 2005/0205663 | A1 * | 9/2005 | Algiene | 235/380 |
| 2005/0242193 | A1 * | 11/2005 | Smith et al. | 235/487 |
| 2005/0247795 | A1 * | 11/2005 | Riedl et al. | 235/488 |
| 2005/0247798 | A1 * | 11/2005 | Graves et al. | 235/493 |
| 2005/0248088 | A1 * | 11/2005 | Yoshida et al. | 273/149 R |
| 2005/0279825 | A1 * | 12/2005 | Ashby et al. | 235/380 |
| 2006/0155063 | A1 * | 7/2006 | Kwok et al. | 525/88 |
| 2006/0228553 | A1 * | 10/2006 | Argoitia et al. | 428/403 |
| 2006/0292946 | A1 * | 12/2006 | Kiekhaefer | 442/43 |
| 2007/0080214 | A1 * | 4/2007 | Collas et al. | 235/380 |
| 2007/0273519 | A1 * | 11/2007 | Ichikawa et al. | 340/572.1 |
| 2008/0018097 | A1 * | 1/2008 | Wicker et al. | 283/91 |
| 2008/0135629 | A1 * | 6/2008 | Douglas | 235/492 |
| 2009/0206164 | A1 * | 8/2009 | Kluge | 235/492 |
| 2009/0230195 | A1 * | 9/2009 | Lasch et al. | 235/488 |
| 2010/0001077 | A1 * | 1/2010 | Kluge | 235/488 |
| 2010/0243733 | A1 * | 9/2010 | Faith et al. | 235/382 |
| 2010/0264227 | A1 * | 10/2010 | Joyce | 235/493 |

FOREIGN PATENT DOCUMENTS

| | | |
|---|---|---|
| WO | 2005086721 A2 | 9/2005 |
| WO | 2005086721 A3 | 9/2005 |

OTHER PUBLICATIONS

Halbur et al., "Stored-Value Card," U.S. Appl. No. 29/280,356, filed May 24, 2007, 12 pages.

Lindahl et al., "Stored-Value Card with Bubble Wand," U.S. Appl. No. 11/404,367, filed Apr. 14, 2006, 32 pages.

Robertson et al., "Financial Transaction Card," U.S. Appl. No. 29/276,559, filed Jan. 29, 2007, 6 pages.

Sabreen, Scott R., "Introduction to Coloring Plastics for Special Decorative Effects," available at www.sabreen.com/coloring_plastics_laser_marking_%20Part%202.pdf, available at least as early as Jun. 22, 2006 per the Internet archive available at www.archive.org, 4 pages.

Travel Tags, Cards for Every Customer, "Raised Surface" and "Textured Surface", available at www.traveltags.com/RaisedTexturedSurface.html?TID=6 at least as early as Nov. 22, 2006 per the Internet archive available at www.archive.org, 1 page.

* cited by examiner

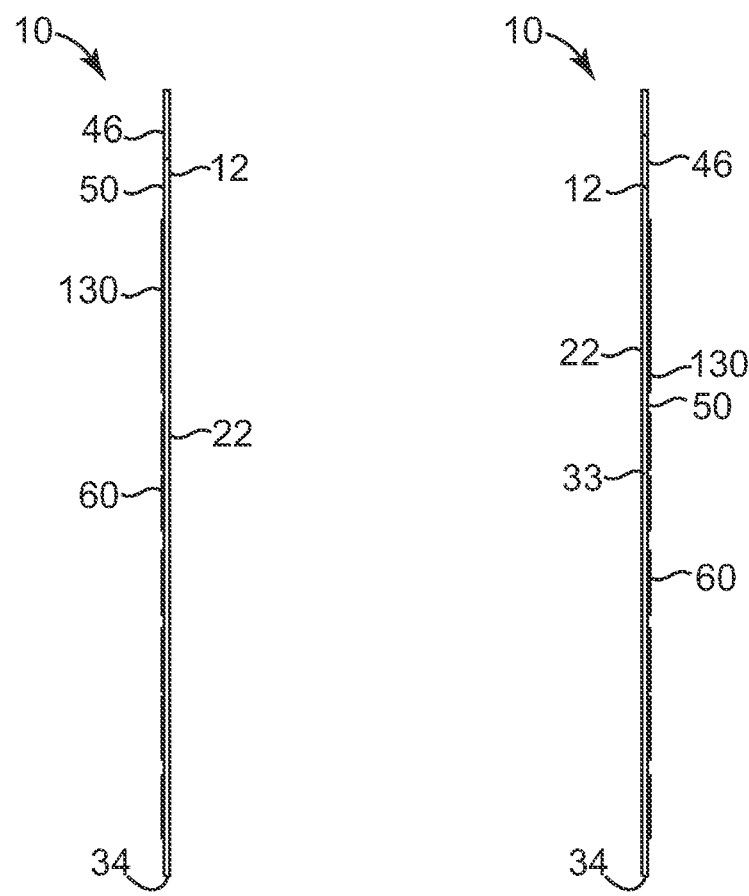
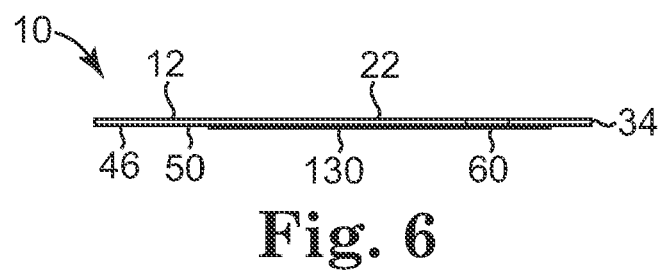
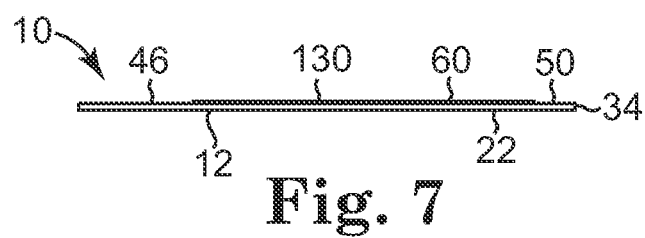

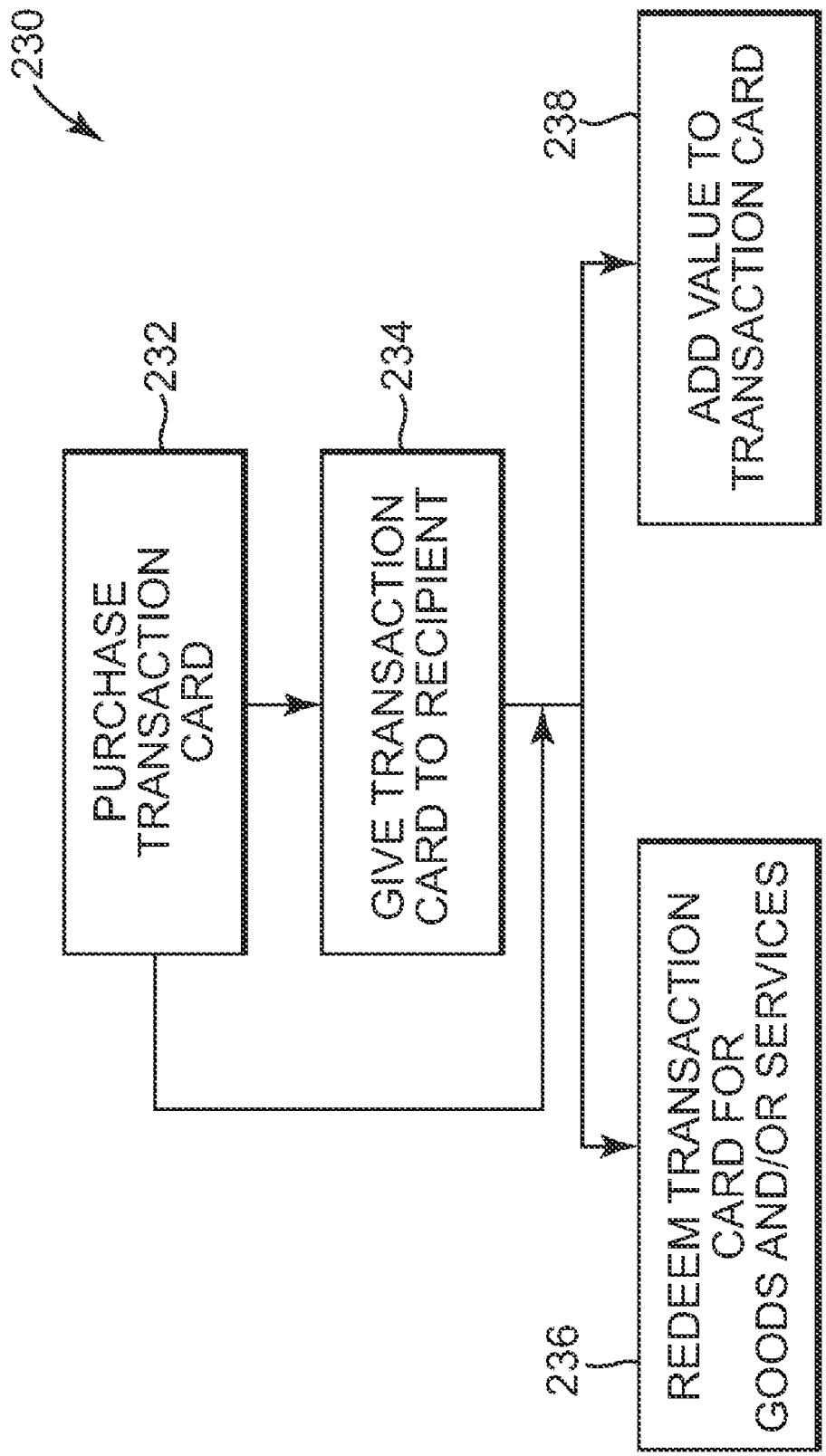

TRANSACTION CARD WITH EDGE-GLOW CHARACTERISTIC

BACKGROUND OF THE INVENTION

Transaction cards come in many forms. A gift card, for example, is a type of stored-value card that includes a preloaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction card including a single layer substrate and an account identifier. The single layer substrate is formed of a transparent polymer resin mixed with a fluorescent dye such that the single layer substrate exhibits an edge-glow characteristic. The single layer substrate is one of transparent and translucent. The account identifier is connected to the single layer substrate and links the transaction card to at least one of an account and a record. The account identifier is machine readable by a point-of-sale terminal. Methods of providing a stored-value card and other embodiments of stored-value or financial transaction cards and associated assemblies are also disclosed.

BRIEF DESCRIPTION OF THE DRAWINGS

Embodiments of the invention will be described with respect to the figures, in which like reference numerals denote like elements, and in which:

FIG. 4 is a right side view illustration of the transaction card of FIG. 1.

FIG. 5 is a left side view illustration of the transaction card of FIG. 1.

FIG. 6 is a top view illustration of the transaction card of FIG. 1.

FIG. 7 is a bottom view illustration of the transaction card of FIG. 1.

FIG. 13 is a flow chart illustrating a method of using a transaction card, according to one embodiment of the present invention.

DETAILED DESCRIPTION

Figure 1:
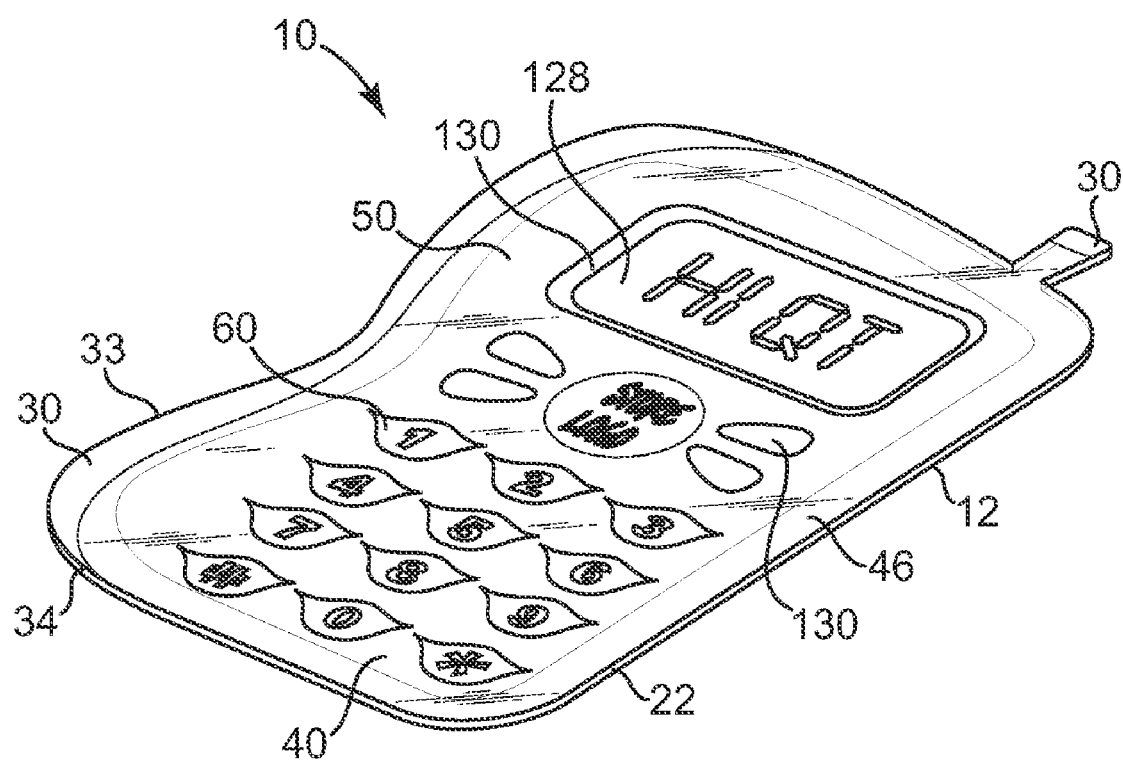
FIG. 1 is a perspective view illustration of a transaction card, according to one embodiment of the present invention.

The following detailed description merely provides examples of the invention and is not intended to limit the invention or the application and uses of the invention. Furthermore, there is no intention to be bound by any theory presented in the preceding background of the invention or the following detailed description of the invention.

A gift card or other transaction card is adapted for making purchases of goods and/or services from, e.g., a retail store or website. According to one embodiment, an original consumer buys the transaction card to give a recipient who in turn is able to use the transaction card at a retail store or setting to pay for goods and/or services. The transaction card, according to embodiments of the present invention, provides the consumer and recipient with extra functionality in addition to the ability to pay for goods and/or services with the transaction card.

Transaction cards according to embodiments of the present invention are formed of a fluorescently dyed material configured to have an edge-glow effect. In one embodiment, the edge-glow effect of the transaction card is enhanced by printing on the fluorescently dyed material near or at edges thereof. In one embodiment, a transparent laminate is applied to the fluorescently dyed material over the printing to create uniform and substantially planar appearance to a front surface of the fluorescently dyed material. Additional printing may be applied to the laminate opposite the fluorescently dyed material, such as raised, glitter, pearlized and/or other printing, which further contributes to the pleasing appearance of the transaction card. In one example, a bar code or other identifier linking the transaction card to an associated record or account is printed or otherwise applied to a surface of the fluorescently dyed material opposite the laminate.

Turning to the figures, FIGS. 1-7 illustrate various views of one embodiment of a transaction card 10 (e.g., a stored-value card) including a substrate 12 and an account identifier 14 coupled thereto. Substrate 12 is any suitable material such as a somewhat rigid yet flexible material similar to that commonly used for identification cards, credit cards, etc. Referring to the rear view illustration of FIG. 3, transaction card 10 includes at least one account activation area or account identifier 14, such as a bar code, a magnetic strip, a smart chip or other electronic device, a radio frequency identification (RFID) device, or other suitable identifier readily machine readable by a point-of-sale terminal, account access station, kiosk or other suitable device. In one embodiment where account identifier 14 is machine readable, account identifier 14 is also readable by a bearer of transaction card 10 such that transaction card 10 can be used when a machine configured to read transaction card 10 is not present (e.g., when using transaction card 10 to make a purchase on a web site). More particularly, in one embodiment, account identifier 14 is printed on or otherwise applied to substrate 12.

Account identifier 14 indicates a financial or other stored-value account or record to which transaction card 10 is linked. The account or record of the monetary value, points, minutes, or other balance associated with transaction card 10 optionally is maintained on a database, other electronic or manual record-keeping system, or, in the case of "smart" cards for example, on a chip or other electronic device on/in transaction card 10 itself. Accordingly, by scanning account identifier 14, the account or record linked to transaction card 10 is identified and can subsequently be activated, have amounts debited therefrom, and/or have amounts credited thereto.

In one embodiment, account identifier 14 includes a character string or code 16 (e.g., a number and/or letter string) configured to provide additional security to the user of transaction card 10 and/or configured to be read by a bearer of transaction card 10 to facilitate use of transaction card 10 for web site or other purchases outside of brick-and-mortar type retail establishments. With the above in mind, account identifier 14 is one example of means for linking transaction card 10 with an account or record, and scanning of account identifier 14 is one example of means for activating or loading value on transaction card 10.

Figure 2:
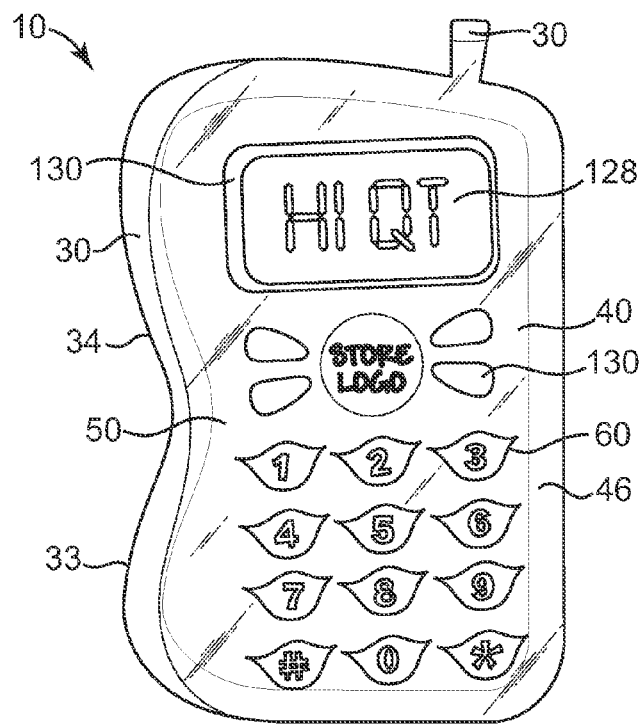
FIG. 2 is a front view illustration of the transaction card of FIG. 1.
Figure 3:
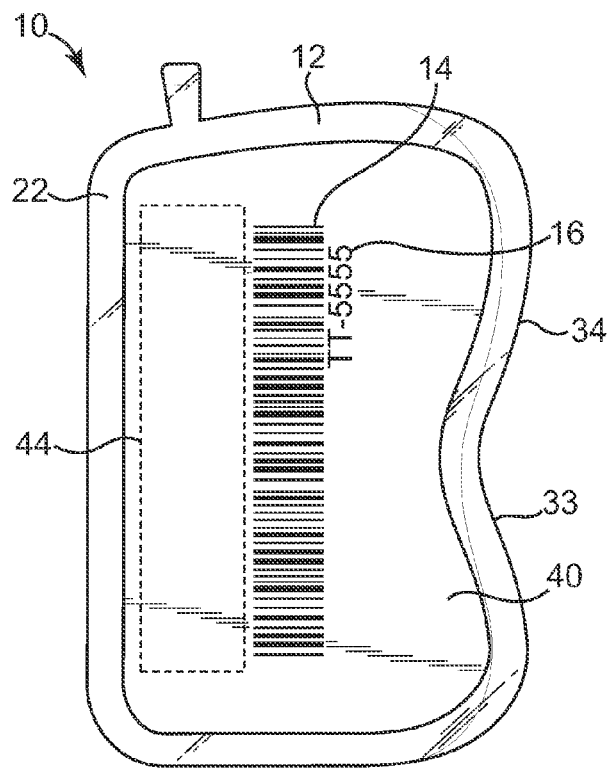
FIG. 3 is a rear view illustration of the transaction card of FIG. 1.
Figure 8:
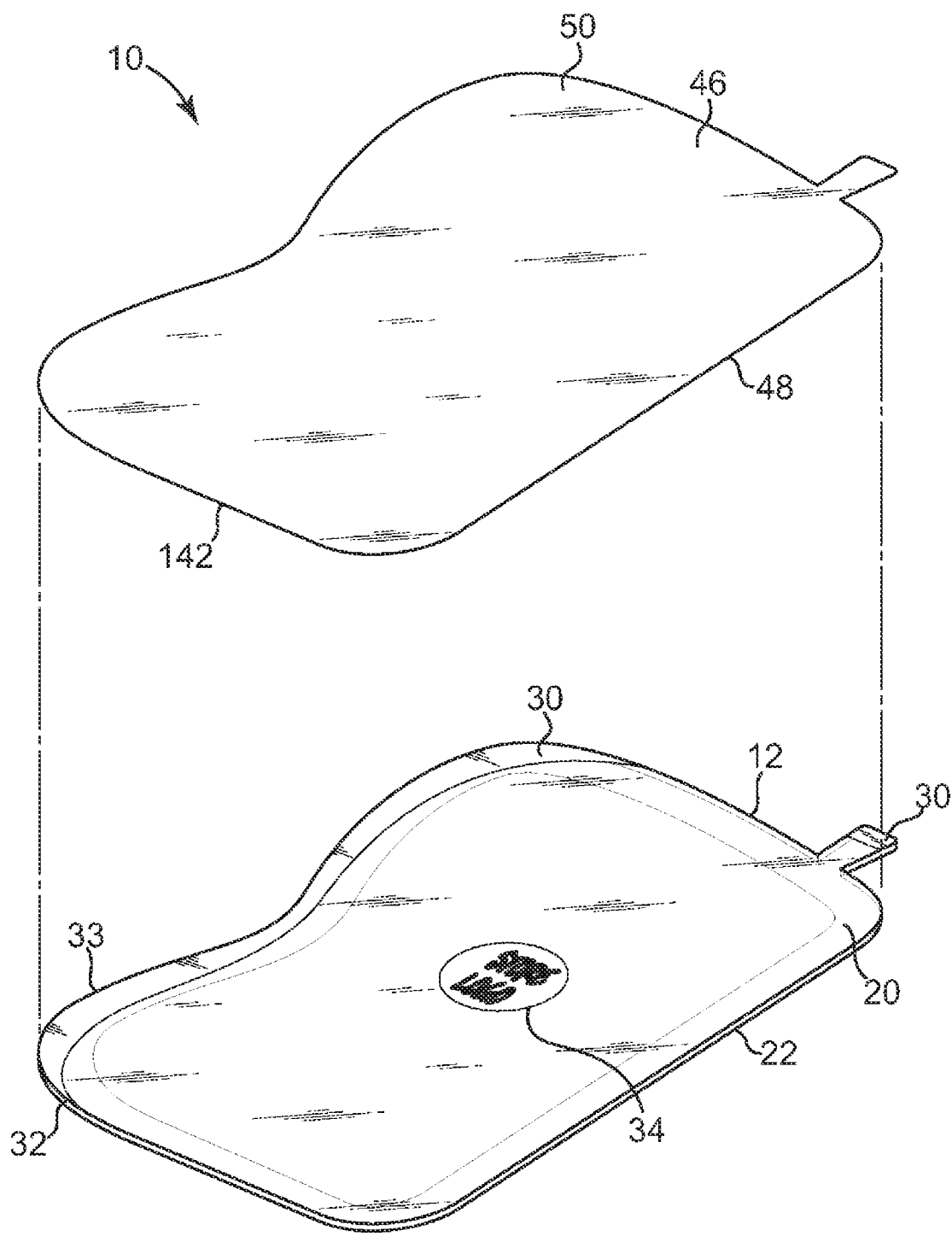
FIG. 8 is an exploded perspective view illustration of a transaction card, according to one embodiment of the present invention.

Additionally referring to FIG. 8, in one embodiment, substrate 12 is substantially planar and defines a front surface 20 (e.g., a first planar surface) and a rear surface 22 (e.g., a second planar surface) opposite front surface 20. In one embodiment, substrate 12 is substantially rectangular in shape, and, in one example, is similarly sized to an identification card, a credit card, or other card sized to fit in a wallet of a card bearer (i.e., are wallet sized). Accordingly, in one example, each of front surface 20 and rear surface 22 is substantially rectangular and/or otherwise wallet sized. In particular, in one embodiment, the overall dimensions of substrate 12 are about 8.5 cm by about 5.5 cm wide with a thickness of less than about 1 mm. In other embodiments, substrate 12 is otherwise shaped as a square, circle, oval, star or any other suitable shape. For example, as depicted in FIGS. 1-3, substrate 12 is shaped to resemble a cordless telephone.

More specifically, in one embodiment, substrate 12 is one of translucent and transparent. For example, substrate 12 may be formed of any suitable material such as plastic. In one example, substrate 12 is formed of single layer sheet stock manufactured using a transparent or substantially clear polymer resin (e.g., a polymer resin of one of polycarbonate, polyester (PET), polystyrene, polyvinyl chloride (PVC), acrylic, acrylonitrile butadiene styrene (ABS) and polybutylene terephalate (PBT)) mixed with a fluorescent dye, more specifically, a pure fluorescent dye. The dyed resin is subsequently extruded to form a substantially planar sheet. Use of the transparent or substantially clear polymer resin with the pure fluorescent dye forms substrate 12 in a manner exhibiting an edge-glow effect or characteristic. In particular, the fluorescent dye or colorant absorbs ultraviolet light and re-emits energy from the ultraviolet light in a form having longer wavelengths. As such, the absorbed ultraviolet light reflects off the internal surfaces of substrate 12, which can be viewed primarily through an outside edge 32 of substrate 12, to create an edge-glow characteristic. Fluorescent dye may be of any suitable color such as pink, red, orange, yellow, blue, green, etc. as will be apparent to those of skill in the art upon reading the present application.

In one example, front surface 20 of substrate 12 is treated to make front surface 20 more amenable to receiving adhesive or for subsequent application of indicia and/or additional treatment. For example, front surface 20 receives a corona discharge treatment to alter the adhesive and/or other binding properties of front surface 20, which is applied in a substantially uniform manner to prevent or at least decrease bubbling, buckling and/or other binding defects of indicia and/or any laminate subsequently applied to front surface 20 as will be further described below. In particular, as used herein, the corona discharge treatment relates to processing of a surface of substrate 12 subjected to treatment adjacent to the surface of an electrical conductor at high voltage. Corona discharge treatment, more specifically, includes applying high voltage, which may be either direct or alternating current, between a pair of electrodes in a gas atmosphere with a pressure of about 150 mg Hg to about 3 atmospheres. Other treatments such as a corona silk screen treatment may alternatively or additionally be applied to front surface 20. In one embodiment, rear surface 22 is treated similarly to front surface 20 (e.g., is corona treated) as described above.

Additionally referring to FIG. 8, to enhance the edge-glow characteristic of substrate 12, in one embodiment, edge indicia 30 are applied to front surface 20 at or near at least a portion of edge 32, which is defined around an outside perimeter of substrate 12. Edge indicia 30 are substantially opaque such that a contrast between edge indicia 30 and an adjacent portion of edge 32 further emphasizes the edge-glow characteristic (i.e., reflection of light viewed from edge 32 of substrate 12). As such, edge indicia 30 are one example of means for enhancing the edge-glow characteristic of substrate 12 or means for enhancing internal light reflection within substrate 12 as viewed through edge 32 of substrate 12. In one embodiment, edge indicia 30 are substantially continuous along and adjacent at least a portion 33 of edge 32 and extend from edge 32 into an interior of substrate 12 as illustrated, for example, in FIGS. 1-3 and 8. As such, the glow-edge characteristic exhibited along portion 33 of edge 32 is generally enhanced as compared to other portions of edge 32. Other indicia, for example, brand indicia 34 or decorative indicia (not shown), may also be printed directly to front surface 20 as will be apparent to one of skill in the art upon reading the present application. In one example, brand indicia 34 include one or more of a logo, text, trademark, etc. that associate transaction card 10 with at least one of a product, a brand, a store, etc.

Referring to FIG. 3, in one embodiment, a masked area 40 is printed or otherwise applied to rear surface 22 of substrate 12. Where substrate 12 is otherwise transparent or translucent, masked area 40 is substantially opaque and applied as a background for indicia printed or otherwise applied to masked area 40. In one example, masked area 40 is screen printed to rear surface 22 of substrate 12 and, in one embodiment, covers a substantial portion of rear surface 22. The indicia printed or otherwise applied over masked area 40 include any suitable objects, graphics, and/or text such as, redemption information 44 (generally indicated with a dashed box in FIG. 3). In one example, contrast between masked area 40 and redemption information 44 facilities a bearer in reading redemption information 44.

In one embodiment, redemption information 44 indicate that transaction card 10 is redeemable for the purchase of goods and/or services and that, upon use, a value of the purchased goods and/or services will be deducted from the account or record linked to transaction card 10. In one embodiment, redemption information 44 include phrases such as "<NAME OF STORE>GiftCard" and "This GiftCard is redeemable for merchandise or services at any of our stores or at our web site," and/or provides help (e.g., account balance information) or phone line information in the case of a lost, stolen, or damaged transaction card.

In one example, where account identifier 14 includes a bar code, number or other printable component, account identifier 14 is printed over masked area 40. Where account identifier 14 is a bar code, applying the bar code to masked area 40 facilitates machine reading of the bar code by providing a substantially opaque background rather than transparent or translucent background, which would otherwise be presented by substrate 12, for account identifier 14. In particular, masked area 40 substantially blocks light from a machine, which is directed toward and used to read the bar code, rather than allowing the light to pass therethrough (e.g., as with transparent and translucent portions of substrate 12), to facilitate more accurate and reliable machine reading of the bar code. In one example, masked area 40 extends beyond an outer periphery of account identifier 14.

Referring to FIG. 8, in one example, a laminate 46 or other continuous surface coating is applied to front surface 20 of substrate 12 over edge indicia 30 and/or other indicia on front surface 20. More specifically, laminate 46 is a relatively thin, clear planar member (e.g., a clear plastic member) applied via lamination over a substantial entirety of front surface 20. In one example, laminate 46 has a thickness of less than about 0.13 mm. In one example, substrate 12 has a thickness more than about 6 times (e.g., more than about 6.5 times) the thickness of laminate 46. Laminate 46 provides a substantially planar internal surface 48, positioned adjacent front surface 20 of substrate 12, and a substantially planar external surface 50 positioned opposite internal surface 48.

In one embodiment, application of laminate 46 to substrate 12 forms a composite card structure, which substantially appears to a casual observer of transaction card 10 as single material despite formation of transaction card 10 with both substrate 12 and laminate 46. As such, edge indicia 30 and any other indicia applied to front surface 20 of substrate 12 prior application of laminate 46 thereto are included in an interior portion of the composite card structure (i.e., between front surface 20 of substrate 12 and internal surface 48 of laminate 46) and, therefore, appear to be integrally formed within the structure of transaction card 10. In one embodiment, only printed indicia (e.g., indicia 30 and 34) and no planar objects are included between front surface 20 of substrate 12 and laminate 46. In view of the above, laminate 46 is one example of means for creating or providing a substantially planar external surface to transaction card 10.

Additionally referring to FIGS. 1 and 2, in one embodiment, transaction card 10 includes other graphic, text, etc. disposed thereon, for example, printed to or otherwise applied to external surface 50 of laminate 46. For example, additional indicia 60 may be disposed on external surface 50 such as decorative indicia contributing to the aesthetics and/or texture of external transaction card 10. For example, wherein substrate 12 is shaped as a cordless telephone, additional indicia 60 may depict a display screen, button, etc., which further contribute to the telephone appearance of transaction card 10. In one embodiment, additional indicia 60 are printed to external surface 50 using a raised ink process, which may incorporate pearlized, glitter or other specialty inks. Any raised ink additional indicia 60 extend from external surface 50 in a manner readily discernable by a bearer of transaction card 10. As such, any raised additional indicia 60 are one example of means for providing tactile elements to external surface 50.

Additional indicia 60 include any item (e.g., graphics or text) depicting or relating to, for example, any one or more of a holiday, a season, an occasion, a media format (e.g., characters, logos, scenes or other illustrations or photographs related to a movie, a television show, a book and/or a video game), etc. In one embodiment, additional indicia 60 are formed on substrate 12 in a solid printing process as opposed to a dot format process. In one example, raised and/or flat additional indicia 60 are applied using a silk screen process. Other indicia or additional features may also be included on transaction card 10 as will be apparent to those of skill in the art upon reading this application.

Figure 9:
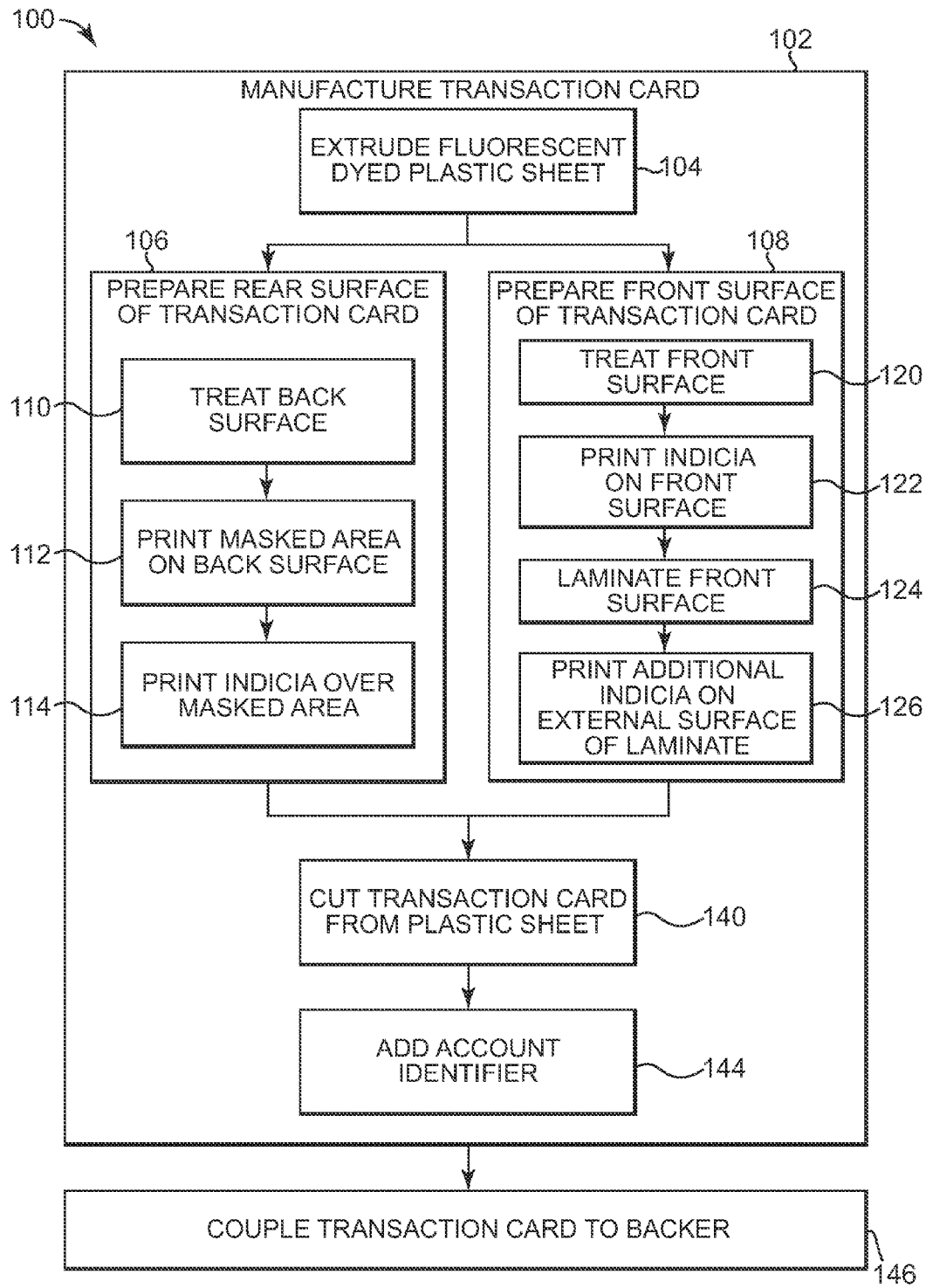
FIG. 9 is a flow chart illustrating a method of forming a transaction card assembly, according to one embodiment of the present invention.

One embodiment of a method of forming a transaction card assembly 152 (FIG. 11) is generally indicated at 100 in FIG. 9. At 102, transaction card 10 is manufactured. More specifically, additionally referring to FIG. 8, at 104, a suitable polymer resin is mixed with a fluorescent dye, and a resultant mixture is extruded to form a plastic sheet, which is configured to exhibit edge-glow characteristics. For example, a polyvinyl chloride polymer is mixed with a pure fluorescent dye (e.g., 1034 A1 trans red dye) and extruded to define a substantially planar plastic sheet (not shown). In one example, the plastic sheet will be cut to form substrate 12 for each of a plurality of transaction cards 10. In one embodiment, the plastic sheet, and therefore, substrate 12, is formed with a thickness of greater than about 0.5 mm, for example, with a thickness of about 0.69 mm. Formation of the plastic sheet defines rear surface 22 and front surface 20 of the plurality of substrates that will be cut therefrom. Rear surface 22 and front surface 20 are respectively prepared at 106 and 108.

More specifically, in one embodiment, preparing rear surface 22 at 106 includes treating rear surface 22 at 110 to promote adhesion and binding of printed and/or other matter to rear surface 22. For example, rear surface 22 may be corona treated (e.g., with corona discharge or silk screen processes) such that rear surface 22 is more receptive to receipt of printing and/or other matter. In one embodiment, rear surface 22 is configured to suitably receive printing and/or other matter without treatment such that operation 110 may be eliminated from method 100.

In one embodiment, at 112, masked area 40 (FIG. 3) is printed to or otherwise applied to rear surface 22. For example, masked area 40 is silk screen printed to rear surface 22 as a solid white or otherwise suitably colored and substantially opaque field. Subsequently, at 114, indicia such as redemption information 44 are printed to masked area 40. In one example, operation 114 includes printing account identifier 14 to masked area 40 while in other embodiments, account identifier 14 will be added in subsequent operations as will be further described below. Other suitable items may be added to rear surface 22 in any suitable manner as will be apparent to those of skill in the art upon reading this application.

In one embodiment, preparing front surface 20 at 108 includes treating front surface 20 at 120 to promote adhesion and binding of printed and/or other matter to front surface 20. For example, front surface 20 may be corona treated (e.g., with corona discharge or silk screen processes) such that front surface 20 is more receptive to receipt of printing and/or other matter. In one example, rear surface 22 is treated at 110 and front surface 20 is treated at 120 substantially simultaneously or sequentially in a single treatment process. In one embodiment, front surface 20 is configured to suitably receive printing and/or other matter without treatment such that operation 120 may be eliminated from method 100.

At 122, edge indicia 30, brand indicia 34 and/or any other desired indicia are printed or otherwise applied to front surface 20. For example, edge indicia 30 are printed to extend from at least a portion of edge 32 of substrate 12 toward an interior of substrate 12 of transaction card 10. In one embodiment, indicia are printed to front surface 20 using substantially flat or non-raised inks so as not to substantially alter the planar nature of front surface 20. Following operation 122, then, at 124, laminate 46 is laminated over or otherwise applied to extend over a substantial entirety of front surface 20 and any printed or other items (e.g., indicia 34 and 36) applied thereto. In one example, laminate 46 is relatively thin and is evenly and continuously applied over front surface 20, for instance, using a compression laminator. Once applied to substrate 12, laminate 46 defines a substantially planar external surface 50 opposite substrate 12, such that indicia 24 and 36 are formed on internal surfaces of transaction card 10 that are not generally accessible from an external surface of transaction card 10. In one embodiment, external surface 50 of laminate 46 is an external surface of transaction card 10 considered as a whole. In one example, laminate 46 is sufficiently thin such that laminate 46 is not readily discernable by a casual viewer of transaction card 10, but rather substrate 12 and laminate 46 generally appear as a member formed of a single material.

Following lamination at 124, then at 126 additional indicia 60 are printed to external surface 50 of laminate 46. In one example, printing additional indicia 60 includes moving transaction card 10 through a plurality of printing passes to print various forms, colors or types of additional indicia 60. More specifically, in one embodiment, operation 126 includes a first printing pass to add flat printed matter 128 (e.g., illustrated in FIGS. 1 and 2 as a display screen) in a silk screen process and a second printing pass to add raised printed matter 130 (e.g., illustrated in FIGS. 1 and 2 as a border around the display screen and as buttons). Any of printed matter (e.g., printed matter 128 and/or printed matter 130) may be formed with pearlized ink, glitter ink, colored ink or other suitable ink to achieve a suitable effect. In one example, raised printed matter 130 enhances the texture of transaction card 10 (e.g., provides a tactile effect to external surface 50 of laminate 46), which makes transaction card 10 more tactilely interesting and pleasing to a bearer of transaction card 10.

At 140, the laminate and printed plastic sheet is cut into a desired shape to form an individual substrate 12 for each transaction card 10. For example, substrate 12 with laminate 46 may be punched, guillotine cut or otherwise sheared to define outside edge 32 of substrate and a corresponding edge 142 (FIG. 8) of laminate 46. Although depicted in FIG. 9 as occurring after completion of operations 106 and 108, in one embodiment, operation 140 may occur prior to or after either and/or both of operations 106 and 108.

At 144, if account identifier 14 has not been previously added to transaction card 10 at or before any of the prior operations, then account identifier 14 is added to transaction card 10 in any suitable manner. For example, where account identifier 14 is a bar code, account identifier 14 is printed in a drop-on-demand process such that a different account identifier 14 is applied to each of the different transaction cards 10, for instance, to masked area 40 thereof. In one embodiment, adding account identifier 14 to transaction card 10 includes adding a magnetic stripe, RFID device or other form of account identifier 14 to transaction card 10, for example, to substrate 12.

Figure 10:
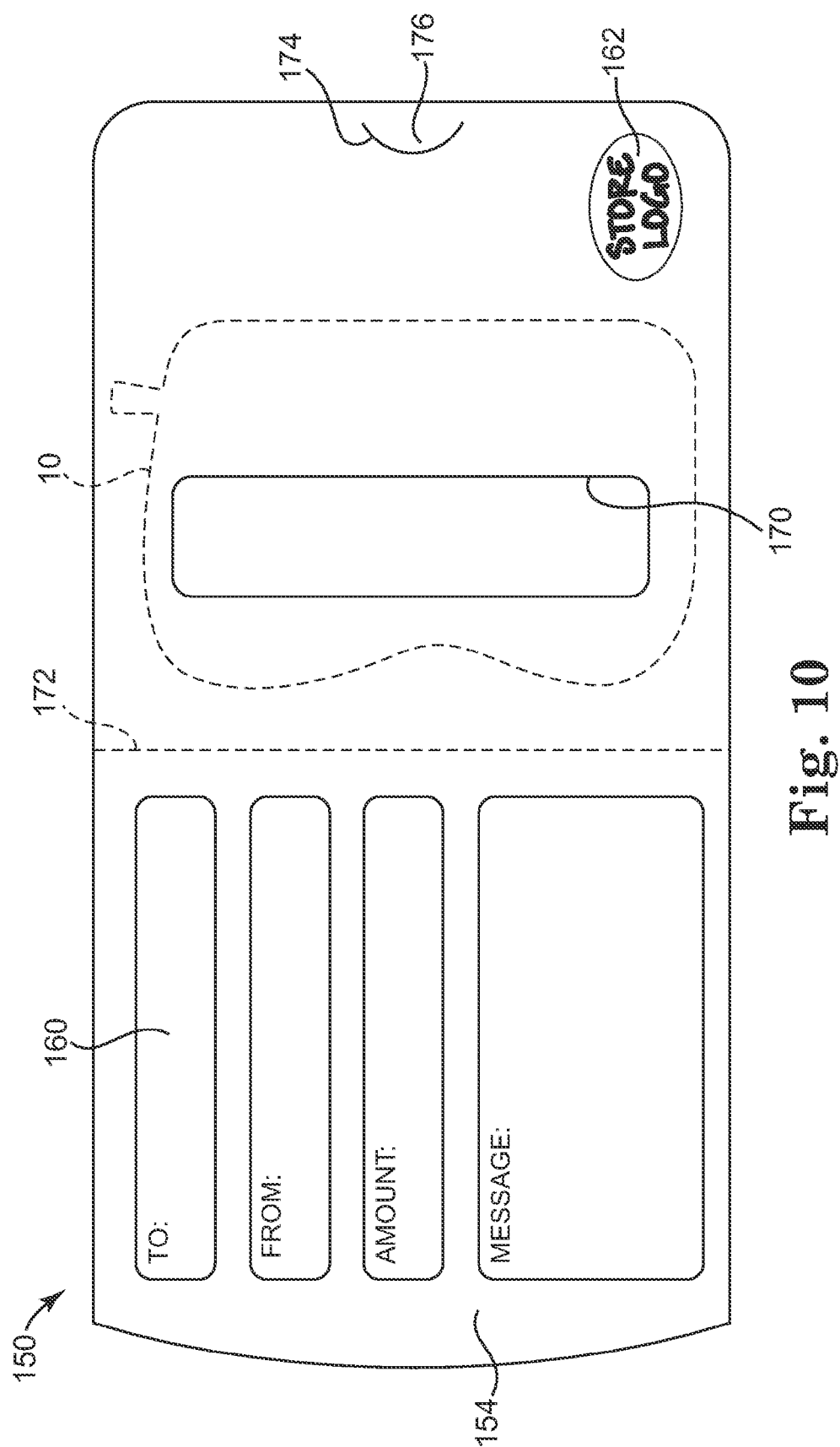
FIG. 10 is a front view illustration of a backer, according to one embodiment of the present invention.
Figure 11:
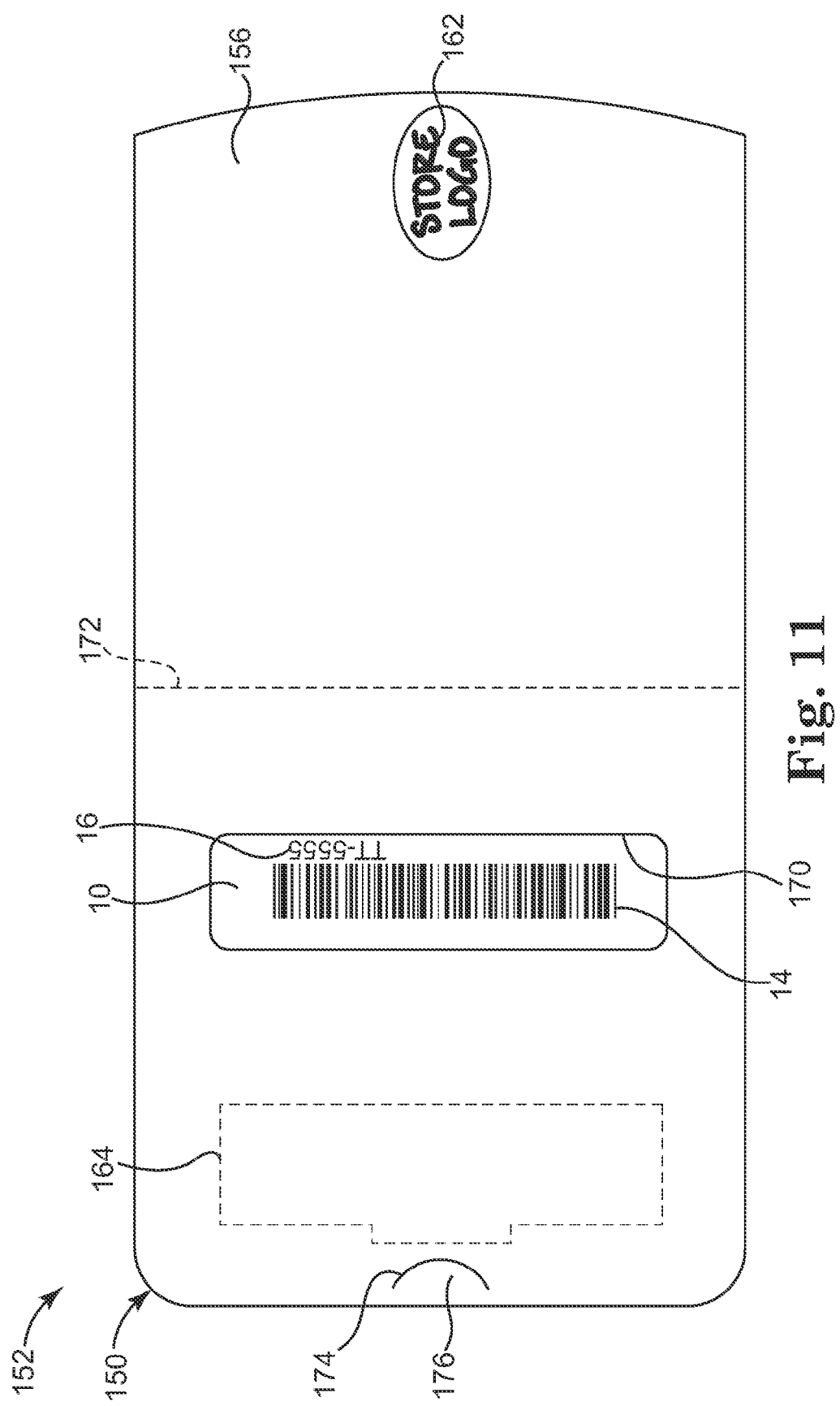
FIG. 11 is a rear view illustration of a transaction card assembly including the backer of FIG. 10 and the transaction card of FIG. 1, according to one embodiment of the present invention.

Following manufacture of transaction card 10 at 102, then at 146, transaction card 10 is coupled with a carrier or backer 150 configured to support transaction card 10 for display and/or sale to potential consumers. For example, FIGS. 10 and 11 illustrate one embodiment of backer 150 for supporting transaction card 10. Transaction card 10, which is represented in phantom lines in FIG. 10 for illustrative purposes so as to not obstruct backer 150, is readily releasably attached to backer 150, for example by a removable adhesive 102, an overlying skinning material, clam packaging or the like. Backer 150 and transaction card 10 collectively define a transaction card assembly 152 (FIG. 11). Backer 150 comprises a single layer or multiple layers of paper or plastic material, for example, generally in the form of a relatively stiff but bendable/flexible card to define an internal or front surface 154 (FIG. 10) and an external or rear surface 156 (FIG. 11) opposite front surface 154. Use of other suitable materials to form backer 150 is also contemplated. Backer 150 displays indicia, graphics or text information including store logo(s), store name(s), slogans, advertising, instructions, directions, brand indicia, promotional information, holiday indicia, seasonal indicia, media format identifiers, characters and/or other information.

For example, indicia 160 include "to," "from," "amount," and "message" fields. The fields of indicia 160 provide areas of backer 150 configured to be written to by a consumer to personalize backer 150 for presentation as a gift to a particular recipient, for a particular purpose, and/or to indicate a value of transaction card 10. In one embodiment, transaction card 10 includes brand indicia 162, which identify a store, brand, department, etc. and/or services associated with transaction card 10.

Referring to FIG. 11, in one embodiment, transaction card 10 includes indicia 164 (generally indicated with a dashed box) indicating that transaction card 10 is redeemable for the purchase of goods and/or services and that upon use, a value of the purchased goods and/or services will be deducted from the financial account or record linked to transaction card 10. In one embodiment, indicia 164 include phrases such as "<NAME OF STORE>GiftCard" and "This GiftCard is redeemable for merchandise or services at any of our stores or at our web site," and/or provides help or phone line information in case of a lost, stolen, or damaged transaction card 10, etc.

Any of indicia 30, 34, 60, 160, 162, 164 or other indicia optionally may appear anywhere on backer 150 or transaction card 10. Additional information besides that specifically described and illustrated herein may also be included and/or one or more of indicia 30, 34, 60, 160, 162, and 164 may be eliminated.

In one embodiment, backer 150 includes a window or opening 170 for displaying account identifier 14 of transaction card 10 therethrough as illustrated in FIG. 11. As previously described, account identifier 14 is adapted for accessing an account or a record associated with transaction card 10 for activating, loading value to, or debiting value from the account or record. Accordingly, opening 170 allows viewing or other access to account identifier 14 to activate and/or load transaction card 10 without removing transaction card 10 from backer 150. In one embodiment, a portion of backer 150 alternatively is configured to be folded away from the remainder of backer 150 to access account identifier 14 without removing transaction card 10 from backer 150.

In one embodiment, backer 150 is a bi-fold substrate defining a fold line 172, about which backer 150 is foldable roughly in half. In FIGS. 10 and 11, backer 150 is unfolded, that is in an open configuration. According to one embodiment, FIG. 10 illustrates front surface 154 of backer 150, which will be supported on a rack or other fixture to be visible to a consumer of a retail store who is considering the purchase of transaction card 10. In another example, while on display in a retail store, backer 150 is folded back about fold line 172 to present only portions of front surface 154 of backer 150 (i.e., the surfaces illustrated in FIG. 10) that are positioned on the same side of fold line 172 as transaction card 10 to a consumer. In such an embodiment, indicia 160 would not be visible to a consumer when backer 150 and transaction card 10 are placed for display in a retail store. Backer 150 is one example of means for supporting transaction card 10 for display in a retail setting.

After purchase, backer 150 is foldable about fold line 172 such that portions of front surface 154 (FIG. 10) of backer 150 are folded toward each other and transaction card 10 is enclosed or wrapped in a compact package formed by foldable backer 150. In this manner, rear surface 156 (FIG. 11) of backer 150 is disposed toward the outside of the folded, compact package, according to embodiments of the invention. In one embodiment, folded backer 150 effectively wraps transaction card 10 for presentation from a consumer to a recipient. Folding backer 150 in the other direction about fold line 172 for display on a rack in a retail setting, or about other fold lines of backer 150 is also contemplated. In one embodiment, although described above and depicted in FIGS. 10 and 11 as a single fold line 172, fold line 172 may be one of a plurality of fold lines (not shown) so as to accommodate various thickness of or to otherwise wrap transaction card 10 as will be apparent to those of skill in the art upon reading this application.

In one embodiment, a cut 174 is formed through backer 150 near an edge of backer 150 that is spaced from and substantially parallel to fold line 172. Cut 174 extends partially toward fold line 172 with an arcuate or other suitable shape and defines a flap 176, which can be partially bent away from the remainder of backer 150. More specifically, upon folding backer 150 about fold line 172 to close backer 150 around transaction card 10, an opposing edge of backer 150 is tucked beneath flap 176 to maintain backer 150 in a folded or closed position. In one embodiment, cut 174 and thereby flap 176 are each substantially semi-circular in shape. Other backers similar to backer 150 can be used having various sizes and shapes for supporting transaction card 10.

Figure 12:
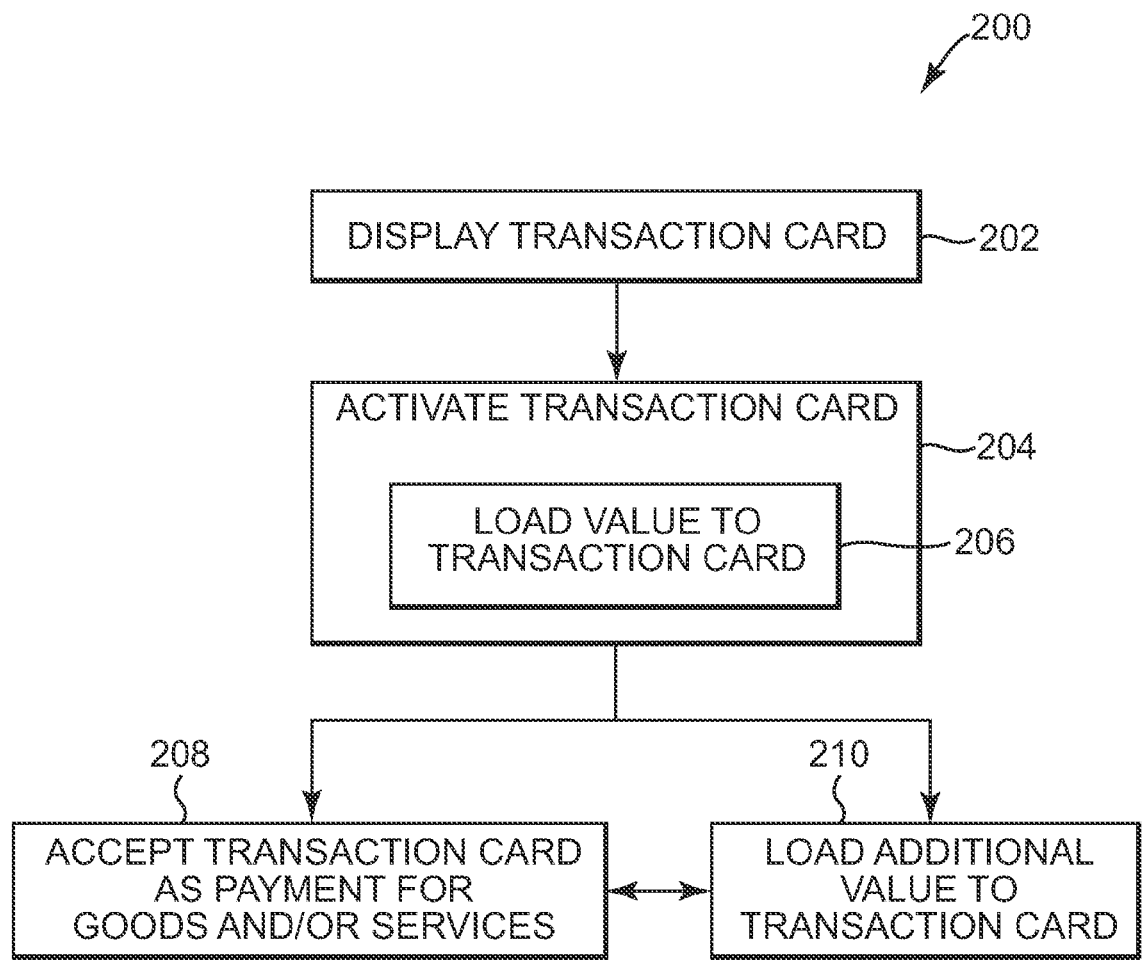
FIG. 12 is a flow chart illustrating a method of encouraging purchase and facilitating use of a transaction card, according to one embodiment the present invention.

FIG. 12 is a flow chart illustrating one embodiment of a method 200 of encouraging purchase and facilitating use of transaction card 10 by consumers and/or recipients. At 202, transaction card 10 is placed on or hung from a rack, shelf or other similar device to display transaction card 10 for sale to potential consumers. For example, additionally referring to FIGS. 10 and 11, backer 150 may be placed on a display rack such that transaction card 10 is readily visible to potential consumers. In one embodiment, a depiction of transaction card 10 is placed on a web site for viewing and purchase by potential consumers.

At 204, a consumer who has decided to purchase transaction card 10 presents transaction card 10, for example, as part of transaction card assembly 152, to a retail store employee, retail store kiosk, remote terminal or other person or device to scan account identifier 14 to access an account or record linked to account identifier 14. In particular, account identifier 14 is scanned or otherwise accessed, for example, through opening 170 of backer 150, to activate transaction card 10. At 206, value is added to the account or record in the form of monetary value, points, minutes, etc. Thus, transaction card 10 is activated and loaded.

In one example, a predetermined value is associated with transaction card 10 (i.e., associated with the account or record linked to transaction card 10 via account identifier 14) prior to activation and display, but such predetermined value is not initially available for use toward the purchase or use of goods and/or services. In such an embodiment, at 204, transaction card 10 is activated to permit subsequent access to the predetermined value (e.g., subsequent loading on and debiting from the account or record) and no additional value is added during activation such that operation 206 may be eliminated.

Once transaction card 10 is activated and loaded, transaction card 10 can be used by the consumer or any other bearer of transaction card 10 to purchase goods and/or services at the affiliated retail setting (e.g., a retail store or web site) or can be used in exchange for calling minutes, etc. In one embodiment, where transaction card 10 is displayed on a web site at 202, then, at 204, transaction card 10 may be activated in any suitable method and may not require the physical scanning of account identifier 14 to be activated or to otherwise access the associated account or record such as at 320.

In one example, at 208, the retail store or other affiliated retail setting or web site accepts transaction card 10 as payment toward the purchase of goods and/or services made by the current bearer of transaction card 10. In particular, the value currently loaded on transaction card 10 (i.e., stored or recorded in the account or record linked to account identifier 14) is applied toward the purchase of goods and/or services. At 210, additional value is optionally loaded on transaction card 10 at a point-of-sale terminal, kiosk or other area of the retail store, retail web site or other related setting. Upon accepting transaction card 10 as payment at 208, the retail store or related setting can subsequently perform either operation 208 again or operation 210 as requested by a current bearer of transaction card 10. Similarly, upon loading additional value on transaction card 10 at 210, the retail store or related setting can subsequently perform either operation 210 again or operation 208. In one example, the ability to accept transaction card 10 as payment for goods and/or services is limited by whether the account or record associated with transaction card 10 has any value stored or recorded therein at the time of attempted redemption.

FIG. 13 is a flow chart illustrating one embodiment of a method 230 of using transaction card 10 (e.g., FIGS. 1-6). At 232, a potential consumer of transaction card 10, which is displayed in a retail store or viewed on a web site, decides to and does purchase transaction card 10 from the retail store or web site. It should be understood that transaction card 10 can be displayed and purchased alone or as part of transaction card assembly 152 (FIG. 11) along with backer 150. Upon purchasing transaction card 10, a retail store employee, a retail store kiosk or other person or device scans account identifier 14 (FIGS. 3 and 11) through opening 170 of backer 150 or otherwise reads or accesses account identifier 14. Upon accessing account identifier 14, the account or record linked to account identifier 14 is accessed and activated to load value onto transaction card 10 (i.e., load value to the account or record associated with transaction card 10). In one embodiment, such as where transaction card 10 is purchased at 232 via a web site, actual scanning or other mechanical detection of account identifier 14 may be eliminated and/or manual input of code 16 may be added.

At 234, the consumer optionally gives transaction card 10 to a recipient, such as a graduate, relative, friend, expectant parents, one having a recent or impending birthday, a couple having a recent or impending anniversary, etc. In one embodiment, a plurality of transaction cards 10 are purchased and given to party goers, such as at a birthday party, etc. as party favors or gifts. As an alternative, the consumer can keep transaction card 10 for his or her own use thereby eliminating operation 234.

At 236, the consumer or recipient redeems transaction card 10 for goods and/or services from the retail store or web site. At 238, the consumer or recipient of transaction card 10 optionally adds value to transaction card 10, more particularly, to the account or record associated with account identifier 14 included therewith, at the retail store or over the Internet (i.e., via the web site). Upon redeeming transaction card 10 at 236 or adding value to transaction card 10 at 238, the consumer or recipient of transaction card 10 subsequently can perform either of operations 236 or 238 as desired. In one embodiment, the ability of the consumer or recipient to repeat redeeming transaction card 10 at 236 is limited by whether the account or record linked with transaction card 10 has any remaining value stored or recorded therein at the time of attempted redemption.

Although primarily described above as occurring at a single retail store or web site, in one embodiment, purchasing transaction card 10 at 232, redeeming transaction card 10 at 236 and adding value to transaction card 10 at 238, can each be performed at any one of a number of stores adapted to accept transaction card 10 or over the Internet. In one example, a number of stores are each part of a chain or are similarly branded stores. In one example, a number of stores include at least one web site and/or at least one conventional brick and mortar store.

Transaction cards and other transaction products come in many forms, according to embodiments of the invention. The gift card, like other transaction products, can be "re-charged" or "re-loaded" at the direction of the original consumer, the gift recipient or a third party. The term "loading on" or "loaded on" herein should be interpreted to include adding to the balance of an account or record associated with a transaction product. The balance associated with the transaction product declines as the transaction product is used, encouraging repeat visits or use. The transaction product remains in the user's purse or wallet, serving as an advertisement or a reminder to revisit the associated merchant. Gift cards according to embodiments of the invention provide a number of advantages to both the consumer and the merchant. Other gift cards and transaction products according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill in the art upon reading this application.

What is claimed is:

1. A transaction card comprising:
a single layer substrate formed of a transparent polymer resin mixed with a fluorescent dye such that the single layer substrate exhibits an edge-glow characteristic, the single layer substrate being one of transparent and translucent, wherein the single layer substrate defines a first surface, a second surface opposite the first surface, and outer edges including an outside edge, wherein the edge-glow characteristic is produced by the fluorescent dye absorbing ultraviolet light and emitting the ultraviolet light reflected off internal surfaces of the single layer substrate, in longer wavelengths than when absorbed, through the outer edges of the single layer substrate;
first indicia printed to the first surface, wherein:
the first indicia are solid, opaque, and printed to the single layer substrate adjacent and directly bordering the outside edge along an entire length of the single layer substrate,
the first indicia extend continuously inwardly from the outside edge a distance greater than a thickness of the single layer substrate, and
the edge-glow characteristic is enhanced along the outside edge by the first indicia, which blocks emission of the ultraviolet light through surface portions of the single-layer substrate covered by the first indicia increasing an amount of ultraviolet light emitted through the outside edge of the single-layer substrate adjacent the first indicia;
a laminate applied to the first surface over the first indicia, wherein:
the laminate is substantially transparent and substantially planar and defines an internal surface and a external surface opposite the internal surface, and
the internal surface is positioned adjacent the first surface of the single layer substrate;
second indicia applied to the external surface of the laminate, wherein:
the second indicia are raised indicia providing a tactile effect to the external surface of the laminate,
the tactile effect is perceivable a bearer of the transaction card touching the external surface of the laminate, and
a second surface of the single layer substrate remains substantially planar as characterized by an absence of any structural altering to the second surface; and
an account identifier connected to the single layer substrate, the account identifier linking the transaction card to at least one of an account and a record, the account identifier being machine readable by a point-of-sale terminal.

2. The transaction card of claim 1, wherein the account identifier includes a bar code.

3. The transaction card of claim 1, wherein the account identifier includes at least one of a bar code, a magnetic strip, an electronic device and a radio frequency identification (RFID) device.

4. The transaction card of claim 1, wherein the fluorescent dye is a pure fluorescent dye.

5. The transaction card of claim 1, wherein the transparent polymer resin is a resin of one of polycarbonate, polyester, polystyrene, polyvinyl chloride, acrylic, acrylonitrile butadiene styrene and polybutylene terephalate.

6. The transaction card of claim 1, wherein the single layer substrate has a thickness greater than about 0.5 mm.

7. The transaction card of claim 1, wherein:
the laminate covers a substantial entirety of the first surface.

8. The transaction card of claim 1, wherein the account identifier is applied to the second surface.

9. The transaction card of claim 1, wherein a masked area is applied to the second surface, and the account identifier is applied to the masked area, wherein the masked area is substantially opaque and extends beyond an outer periphery of the account identifier.

10. The transaction card of claim 1, wherein the raised indicia are exposed to an environment surrounding the transaction card.

11. A stored-value card comprising:
a substantially planar member that is one of translucent and transparent and defines a first substantially planar surface and a second substantially planar surface opposite the first substantially planar surface, wherein the substantially planar member is formed from a substantially transparent resin mixed with a fluorescent dye to produce an outer edge-glow characteristic when the fluorescent dye absorbs light and emits the absorbed light, as reflected off internal surfaces of the substantially planar member, through outside edges of the substantially planar member, in longer wavelengths than when the light was absorbed;
means for enhancing internal light reflection within the substantially planar member as viewed through an edge of the substantially planar member, the means for enhancing internal light reflection being applied to a portion of a first surface of the substantially planar member directly adjacent the edge of the substantially planar member to substantial block emission of the light reflected off the internal surfaces through a portion of the first surface of the substantially planar member directly adjacent the edge of the substantially planar member, which increases an amount of light emitted through the edge of the substantially planar member;

translucent or transparent means for covering and directly abutting the first substantially planar surface and the means for enhancing internal light reflection, the translucent or transparent means defining an external surface opposite the substantially planar member;

means for providing tactile elements applied to the external surface of the translucent or transparent means to provide a tactile effect to the external surface that is readily perceivable by a bearer of the stored-value card when the bearer of the stored-value card touches the external surface of the translucent or transparent means, wherein the means for providing tactile elements is characterized by a lack of structural impact on the second substantially planar surface such that the second substantially planar surface remains substantially planar; and means for linking the substantially planar member with at least one of an account and a record having a value associated therewith such that the stored-value card can be redeemed for one or more of payment toward a purchase of goods or services and use of goods or services, the means for linking the substantially planar member being connected to the second substantially planar surface of the substantially planar member.

12. A method of providing a transaction card, the method comprising:

extruding a mixture, which includes a polymer resin and a fluorescent dye, to form a substantially planar substrate that is one of translucent and transparent, the substantially planar substrate defining an outside edge of the substantially planar substrate and producing an edge-glow characteristic along the outside edge by absorbing external light and reflecting the absorbed external light off internal surfaces of the substantially planar substrate such that the reflected light is emitted from the substantially planar substrate via the outside edge in longer wavelengths than when the external light was absorbed;

printing an opaque field to a portion of a first surface of the substantially planar substrate such that the opaque field directly borders a length of a first side of the outside edge, the opaque field extending continuously inwardly from the length of the first side of the outside edge of the substantially planar substrate a distance greater than a thickness of the substantially planar substrate to enhance an edge-glow characteristic of the substantially planar substrate by substantially preventing emission of light reflected off internal surfaces of the substantially planar substrate through the portion of the first surface of the substantially planar substrate printed with the opaque field such that an amount of light reflected off internal surfaces of the substantially planar substrate and emitted out the length of the first side of the outside edge is increased;

applying a clear laminate over the opaque field and the first surface of the substantially planar substrate;

printing raised indicia on an external surface of the clear laminate, the external surface of the clear laminate being positioned opposite the substantially planar substrate such that the second surface of the substantially planar surface remains structurally undisturbed and substantially planar after the printing of the raised indicia, wherein the raised indicia are tactilely perceivable by a bearer of the transaction card when the bearer touches the external surface of the laminate;

printing a masked area to a second surface of the substantially planar substrate, the second surface being positioned opposite the first surface of the substantially planar substrate, and the masked area being substantially opaque; and applying an account identifier to the masked area of the transaction card, wherein the account identifier links the transaction card to an account or record.

13. The method of claim 12, wherein printing the masked area and applying the account identifier to the masked area are performed such that the masked area extends beyond an outer periphery of the account identifier.

14. A stored-value card linked to a record or account having a value available for application toward one of a purchase and a use of one or more of goods and services, the stored-value card comprising:

a substantially planar substrate being one of transparent and translucent, including a fluorescent dye, and defining a first surface and an outer edge, wherein the outer edge extends along an entire length of the substantially planar substrate, an account identifier coupled with the substantially planar substrate to link the substantially planar substrate to the record or account, and a substantially continuous opaque field applied to a portion of the first surface of the substantially planar substrate directly abutting the outer edge along at least the entire length of the substantially planar substrate and extending inwardly from the outer edge at least a distance greater than a thickness of the substantially planar substrate to enhance, via visual differentiation, an edge-glow characteristic of the outer edge, wherein:

the edge-glow characteristic results from the fluorescent dye absorbing ultraviolet light from an environment, reflecting at least some of the absorbed ultraviolet light off internal surfaces of the substantially planar substrate, and emitting the reflected ultraviolet light through the outer edge of the substantially planar member in longer wavelengths than when the ultraviolet light was absorbed from the environment, the substantially continuous opaque field enhances the edge glow characteristic of the outer edge by substantially preventing the absorbed ultraviolet light reflected off internal surfaces of the substantially planar substrate from exiting the substantially planar substrate through the portion of the first surface of the substantially planar substrate having the substantially continuous opaque field applied thereto such that an amount of the absorbed ultraviolet light reflected off internal surfaces of the substantially planar substrate and emitted through the outer edge along at least the entire length of the substantially planar substrate is increased relative to a remainder of the substantially planar substrate, and raised indicia applied to the first surface of the substantially planar substrate to form tactile features that are perceivable by a bearer of the stored-value card when the bearer touches the first surface, wherein a second surface of the substantially planar substrate is defined opposite the first surface and remains free from structural alteration by the tactile features.

15. The stored-value card of claim 14, in combination with a carrier supporting and coupled to the stored-value card, the carrier and the stored-value card collectively defining a stored-value card assembly.

* * * * *